(12) United States Patent
Kuramoto et al.

(10) Patent No.: US 8,459,113 B2
(45) Date of Patent: Jun. 11, 2013

(54) MAGNETICALLY REINFORCED SERVO ACCELEROMETER

(75) Inventors: Kenji Kuramoto, Tokyo (JP); Yoshiyuki Ando, Iruma (JP); Hiroyuki Motoki, Tokyo (JP); Shuichi Yamamoto, Tokyo (JP); Takazumi Yamada, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 299 days.

(21) Appl. No.: 13/013,614

(22) Filed: Jan. 25, 2011

(65) Prior Publication Data

US 2011/0209545 A1 Sep. 1, 2011

(30) Foreign Application Priority Data

Feb. 26, 2010 (JP) ................. 2010-041199

(51) Int. Cl.
*G01P 15/13* (2006.01)
*G01P 15/08* (2006.01)

(52) U.S. Cl.
USPC ..................................... 73/514.21

(58) Field of Classification Search
USPC ............ 73/514.21, 514.17, 514.18, 514.22, 73/514.23, 514.24, 514.26, 493
See application file for complete search history.

(56) References Cited

U.S. PATENT DOCUMENTS

2008/0041158 A1* 2/2008 Yamamoto ................. 73/514.36
2010/0192691 A1* 8/2010 Yamamoto ................. 73/514.21

FOREIGN PATENT DOCUMENTS

JP  H08-292208  11/1996
JP  3245675  1/2002

* cited by examiner

*Primary Examiner* — Helen Kwok
(74) *Attorney, Agent, or Firm* — David N. Lathrop

(57) ABSTRACT

Canister-shaped magnetic reinforcing elements 31, 32 made of a ferromagnetic material having a Curie temperature higher than magnetic yokes 11, 12 are provided inside the magnetic yokes 11, 12. The inner periphery 31a, 32a of an opening in each of the magnetic reinforcing elements 31, 32 is opposed to the outer periphery 51a, 52a of each of pole piece tops 51, 52. A torquer coil 61, 62 is located between the inner periphery 31a, 32a of the opening in each of the magnetic reinforcing elements 31, 32 and the outer periphery 51a, 52a of each pole piece top 51, 52. The magnetic reinforcing elements 31, 32 provided inside the magnetic yokes 11, 12 form independent magnetic circuits. Since the magnetic reinforcing elements 31, 32 have a Curie temperature higher than the magnetic yokes 11, 12, a high accuracy of acceleration measurement in a high-temperature range can be achieved.

4 Claims, 9 Drawing Sheets

MAGNETICALLY REINFORCED SERVO ACCELEROMETER

TECHNICAL FIELD

The present invention relates to a servo accelerometer in which torquer coils are attached to a pendulum, a current based on a displacement (deflection) of the pendulum caused by an acceleration input is passed through the torquer coils to apply an electromagnetic force to the pendulum to balance the pendulum at a neutral position.

BACKGROUND ART

FIG. 9 illustrates a conventional servo accelerometer including a pendulum part made of quartz glass, which is a low thermal expansion material. In the conventional servo accelerometer, magnetic yokes 91, 92 made of invar, which is also a low thermal expansion material, support the pendulum part 93 to prevent thermal expansion strains. However, since invar has a low Curie temperature, magnetic saturation occurs in a high-temperature range, reducing the saturation flux density applied to a torquer coil 94. As a result, a temperature characteristic of the scale factor of the servo accelerometer becomes nonlinear and accordingly the accuracy of acceleration measurement can disadvantageously decrease.

In a servo accelerometer described in Japanese Patent Application Laid-Open No. 8-292208 (hereinafter referred to as Patent literature 1), magnetic reinforcing plates 97, 98 having a higher saturation flux density than cup-shaped magnetic yokes 91, 92 are provided on the outer bottoms of the magnetic yokes 91, 92 in order to reinforce magnetic circuits formed by magnets 95, 96, respectively.

SUMMARY OF THE INVENTION

However, the magnetic reinforcing plates 97, 98 in Patent literature 1 only partially reinforce the magnetic circuits and magnetic saturation occurs in regions other than the magnetic reinforcing plates 97 and 98, for example regions R in FIG. 9, at high temperatures near the Curie temperature of invar (approximately 210° C.), decreasing the accuracy of acceleration measurement.

According to the present invention, in order to solve the issue, a canister-shaped magnetic reinforcing element made of a ferromagnetic material having a higher Curie temperature than a magnetic yoke is provided inside the magnetic yoke, the inner periphery of an opening in the magnetic reinforcing element is opposed to the outer periphery of a pole piece top, and a torquer coil is located between the inner periphery of the opening in the magnetic reinforcing element and the outer periphery of the pole piece top.

EFFECTS OF THE INVENTION

Since the Curie temperature of the magnetic reinforcing element which is provided inside the magnetic yoke and forms an independent magnetic circuit has a higher Curie temperature than the magnetic yoke, a higher accuracy of acceleration measurement in a high-temperature range than the accuracies of conventional servo accelerometers can be achieved.

DETAILED DESCRIPTION OF THE EMBODIMENTS

Figure 1:
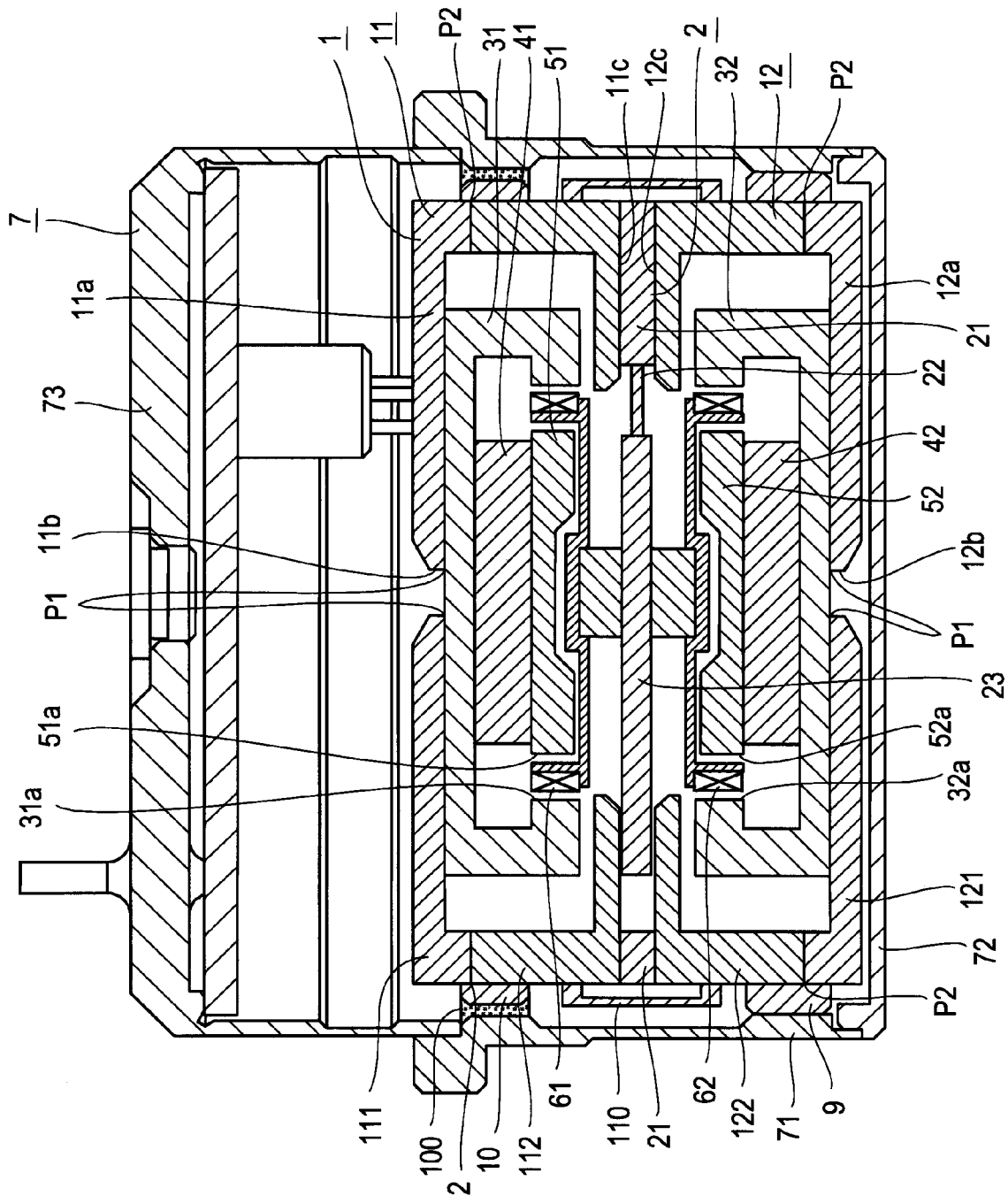
FIG. 1 is a cross-sectional view illustrating a configuration of an embodiment of a servo accelerometer according to the present invention.

Embodiments of the present invention will be described with reference to drawings. FIG. 1 illustrates a configuration of an embodiment of a servo accelerometer according to the present invention.

A circular pendulum part 2 includes a substantially annular frame 21, a substantially disc-shaped pendulum 23 having a diameter smaller than the inner diameter of the frame 21, and a hinge 22 that positions the pendulum 23 inside the frame 21 so that the pendulum 23 is supported by the frame 21 in such a manner that the pendulum 23 can swing in the direction of the thickness of the pendulum 23. The frame 21, the pendulum 23 and the hinge 22 are integrally formed of quartz, for example, to form the pendulum part 2. The hinge 22 is thin and elastically deformable. Magnetic yokes 11 and 12 are placed in contact with the top and bottom surfaces, respectively, of the frame 21 of the pendulum part 2 as illustrated in FIG. 1. The pendulum part 2 is sandwiched between the magnetic yokes 11 and 12.

One side of each of the magnetic yokes 11 and 12 has the shape of a cup one end of which is open and the other end is closed by a closing plate 11a, 12a. The magnetic yokes 11, 12 are made of a low thermal expansion material, for example invar. A through-hole 11b, 12b for laser welding is provided in a central region of the closing plate 11a, 12a of each of the magnetic yokes 11 and 12. In the example in FIG. 1, each of the magnetic yokes 11, 12 is formed by laser-welding a main body 111, 121 including the closing plate 11a, 12a to a cylindrical part 112, 122 including the open side, at positions P2. Laser welding at positions P2 is performed after at least a magnetic reinforcing element 31, 32 is placed inside the magnetic yoke 11, 12.

The magnetic reinforcing elements 31, 32, magnets 41, 42, and pole piece tops 51, 52 are contained inside the magnetic yokes 11, 12, respectively. The magnetic reinforcing elements 31, 32, the magnets 41, 42, and the pole piece tops 51, 52 are stacked in sequence on the inner surface of the closing plates 11a, 12a, respectively, that close the other side of the magnetic yokes 11, 12, in such a manner that their central axes are aligned with the central axes of the magnetic yokes 11, 12. The outer regions of the pole piece tops 51, 52 are thick as illustrated in FIG. 1.

The magnetic reinforcing elements 31, 32 are canister-shaped and made of a ferromagnetic material having a Curie temperature higher than the magnetic yokes 11, 12. The magnetic reinforcing elements 31, 32 may be made of electromagnetic soft iron or pure iron. The inner periphery 31*a*, 32*a* of the opening of each of the magnetic reinforcing elements 31, 32 faces the outer periphery 51*a*, 52*a* of the pole piece top.

The magnets 41, 42 are circular and are made of a rare-earth cobalt magnet such as samarium cobalt magnet, for example. The pole piece tops 51, 52, are circular and are made of electromagnetic soft iron, for example. The magnets 41, 42 are magnetized in their thickness direction. An annular magnetic cavity is formed between the inner periphery 31*a*, 32*a* of the opening in each of the magnetic reinforcing elements 31, 32 and the outer periphery 51*a*, 52*a* of each of the pole piece tops 51, 52.

The magnetic reinforcing elements 31, 32 are fixed to the magnets 41, 42, respectively, by bonding, for example, and the magnets 41, 42 are also fixed to the pole piece tops 51, 52, respectively, by bonding, for example. On the other hand, the magnetic yokes 11, 12 are laser-welded to the magnetic reinforcing elements 31, 32, respectively, with laser applied through the through-holes 11*b*, 12*b* in the central regions of the outer bottoms of the magnetic reinforcing elements 31, 32, respectively, as disclosed in Japanese Patent No. 3245675. In the example in FIG. 1, the magnetic yokes 11, 12 are laser-welded to the magnetic reinforcing elements 31, 32, respectively, at positions P1 on the circumferences of the through-holes 11*b*, 12*b*, respectively.

The magnetic reinforcing elements 31, 32 are made of a material, such as electromagnetic soft iron, that has a higher thermal expansion rate than invar, which is the material of the magnetic yokes 11, 12. Accordingly, if the magnetic reinforcing elements 31, 32 are simply bonded to the magnetic yokes 11, 12, respectively, they can become unstuck due to the difference between them in rate of thermal expansion resulting from a temperature change. By laser-welding the magnetic reinforcing elements 31, 32 to the magnetic yokes 11, 12, respectively, on the circumferences of the through-holes 11*b*, 12*b* in the central regions of the outer bottoms of the magnetic reinforcing elements 31, 32, respectively, the difference in expansion and contraction between them due to the difference in thermal expansion rate resulting from a temperature change can be decreased to reduce thermal stress, thereby ensuring solid joining between the magnetic reinforcing elements 31, 32 and the magnetic yokes 11, 12, respectively.

Cylindrical torquer coils 61, 62 are attached to both surfaces of the pendulum 23. Specifically, the torquer coils 61, 62 are wound on bobbins, which are fitted in cylinders fixed on both surfaces of the pendulum 23 by bonding. The cylinder is made of quartz, like the pendulum.

An arc-shaped electrode (not depicted) is formed on each surface of the pendulum 23 in a position near the outer periphery of each of the torquer coils 61, 62. The surface of the open side of each magnetic yoke 11, 12 functions as an electrode opposed to the electrode on the pendulum 23.

Surfaces 11*c*, 12*c* of the magnetic yokes 11, 12 are bonded on the surfaces of the frame 21 of the pendulum part 2 so that the surfaces 11*c* and 12*c* sandwich the pendulum part 2, thereby the magnetic yokes 11, 12 are integrated with the pendulum part 2 to form a sensing mechanism 1 that detects acceleration. Each of the torquer coils 61, 62 is located in the gap between the inner periphery of the opening of each of the magnetic reinforcing elements 31, 32 and the outer periphery of each of the pole piece tops 51, 52. The electrodes attached on the pendulum 23 face the surface of the open sides of the magnetic yokes 11, 12, which function as electrodes.

An outer ring 110 is attached to the outer peripheries of the magnetic yokes 11, 12 in such a manner that the outer ring 110 is situated across the boundary between the magnetic yokes 11 and 12. The magnetic yokes 11, 12 are electrically connected through the outer ring 110. Like the magnetic yokes 11, 12, the outer ring 110 is made of invar and bonded to the magnetic yokes 11, 12 with an electrically conductive adhesive.

A housing 7 protects the sensing mechanism 1 which detects acceleration, and also functions as a mounting mechanism for mounting the sensing mechanism 1 to an object (a mobile object) the acceleration of which is to be detected. The housing 7 is formed by integrating a body housing 71, a bottom housing 72 and a top housing 73 in one piece.

A C-ring 9 is attached around the magnetic yoke 12 and the sensing mechanism 1 is fixed to and supported by the housing 7 through the C-ring 9. The C-ring 9 is fixed to the magnetic yoke 12 and the housing 7 by bonding.

A C-ring 10 is attached around the magnetic yoke 11. The C-ring 10 is fixed to the magnetic yoke 11 by bonding. The space between the C-ring 10 and the housing 7 is filled with a flexible adhesive 100 made of a material such as silicone resin. The C-rings 9, 10 are provided for ensuring the stability of the sensing mechanism 1. The C-rings 9, 10 are made of aluminum.

In the servo accelerometer having the configuration described above, a displacement of the pendulum 23 in the thickness direction caused by an acceleration input is detected as a change in capacitance of the electrodes on the pendulum 23 and their opposite electrodes, that is, the surface of the open sides of the magnetic yokes 11, 12. (The electric signal path is not depicted.) The surfaces of the open sides of the magnetic yokes 11, 12 are commonly grounded. A detection signal from the electrodes on both surfaces of the pendulum 23 is differential-amplified by an appropriate electric circuit (not depicted) and a current based on the difference in capacitance flows through the pair of torquer coils 61, 62. The current flowing through the torquer coils 61, 62 interacts with a magnetic field generated by the magnets 41, 42 to return the pendulum 23 to its initial position, thereby balancing the pendulum at its neutral position. Since the current flowing at this time is proportional to the acceleration applied to the pendulum 23, the acceleration can be determined from the current.

In this way, the canister-shaped magnetic reinforcing elements 31, 32 are provided inside the magnetic yokes 11, 12, the inner peripheries 31*a*, 32*a* of the openings in the magnetic reinforcing elements 31, 32 are opposed to the outer peripheries 51*a*, 52*a* of the pole piece tops 51, 52, respectively, torquer coils 61, 62 are located between the inner peripheries 31*a*, 32*a* of the openings in the magnetic reinforcing elements 31, 32 and the outer peripheries 51*a*, 52*a* of the pole piece tops 51, 52, respectively, so that the magnetic reinforcing elements 31, 32 form independent magnetic circuits. Since the Curie temperature of the magnetic reinforcing elements 31, 32 are higher than the Curie temperature of the magnetic yokes 11, 12, the magnetic circuits formed by the magnetic reinforcing elements 31, 32 are not magnetically saturated even in a high-temperature range close to the Curie temperature of the magnetic yokes 11, 12. Accordingly, a higher accuracy of acceleration measurement in a high-temperature range than the accuracies of conventional servo accelerometers can be achieved.

Figure 2:
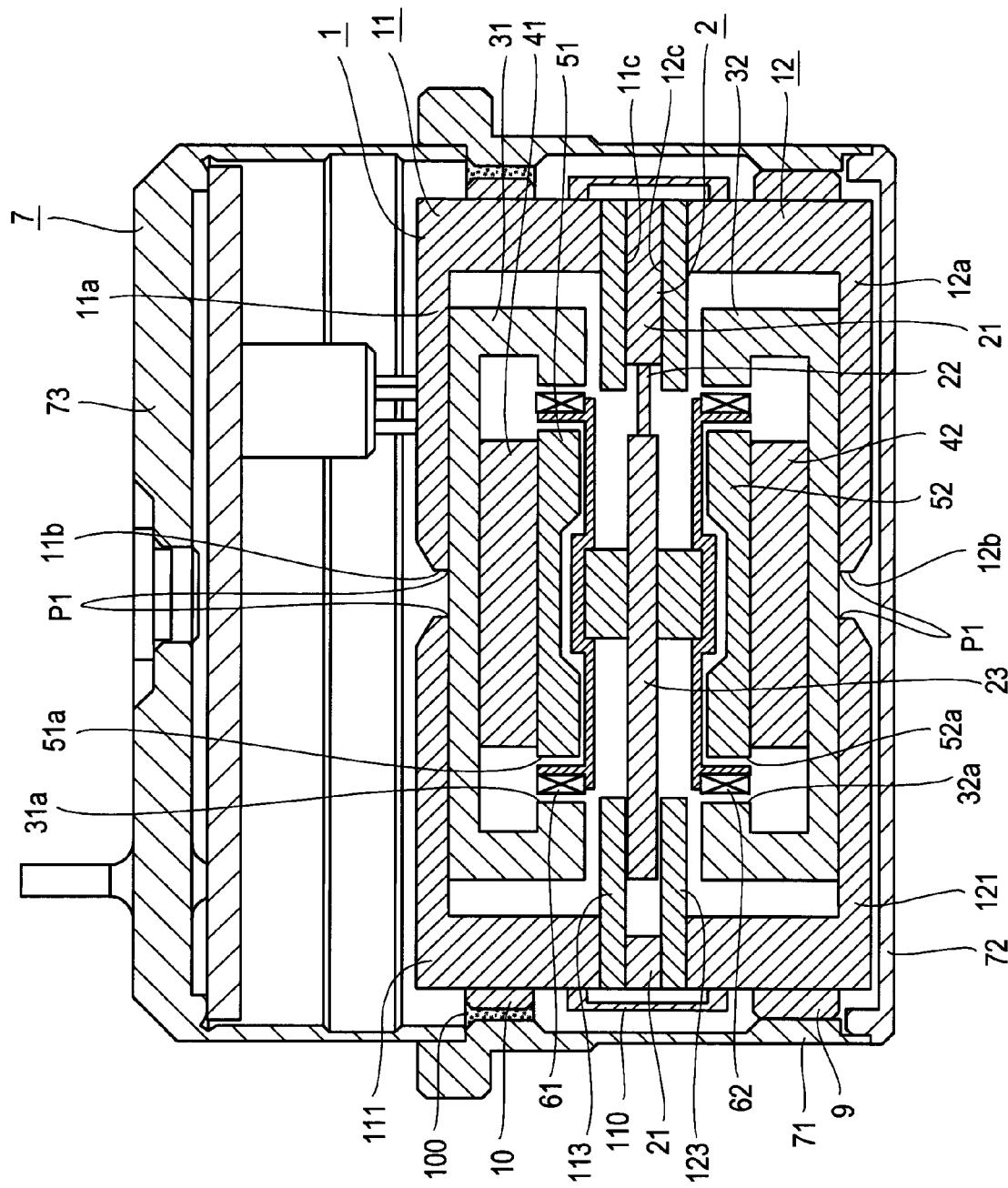
FIG. 2 is a cross-sectional view illustrating a configuration of another embodiment of a servo accelerometer according to the present invention.

As illustrated in FIG. 2, the magnetic yokes 11, 12 may be formed by integrating pickoff rings 113, 123, respectively, which have the shape of a toroidal disc including one side in which an opening is provided and main bodies 111, 121 including the other side at which closing plates 11a, 12a are provided. The pickoff rings 113, 123 and the main bodies 111, 121 are made of invar. The toroidal-disc-shaped structure can be formed with a high dimensional accuracy. Accordingly, by using the structure illustrated in FIG. 2, the pendulum part 2 can be sandwiched between the magnetic yokes 11 and 12 with a high dimensional accuracy and therefore a servo accelerometer with a higher measuring accuracy can be fabricated.

Figure 3:
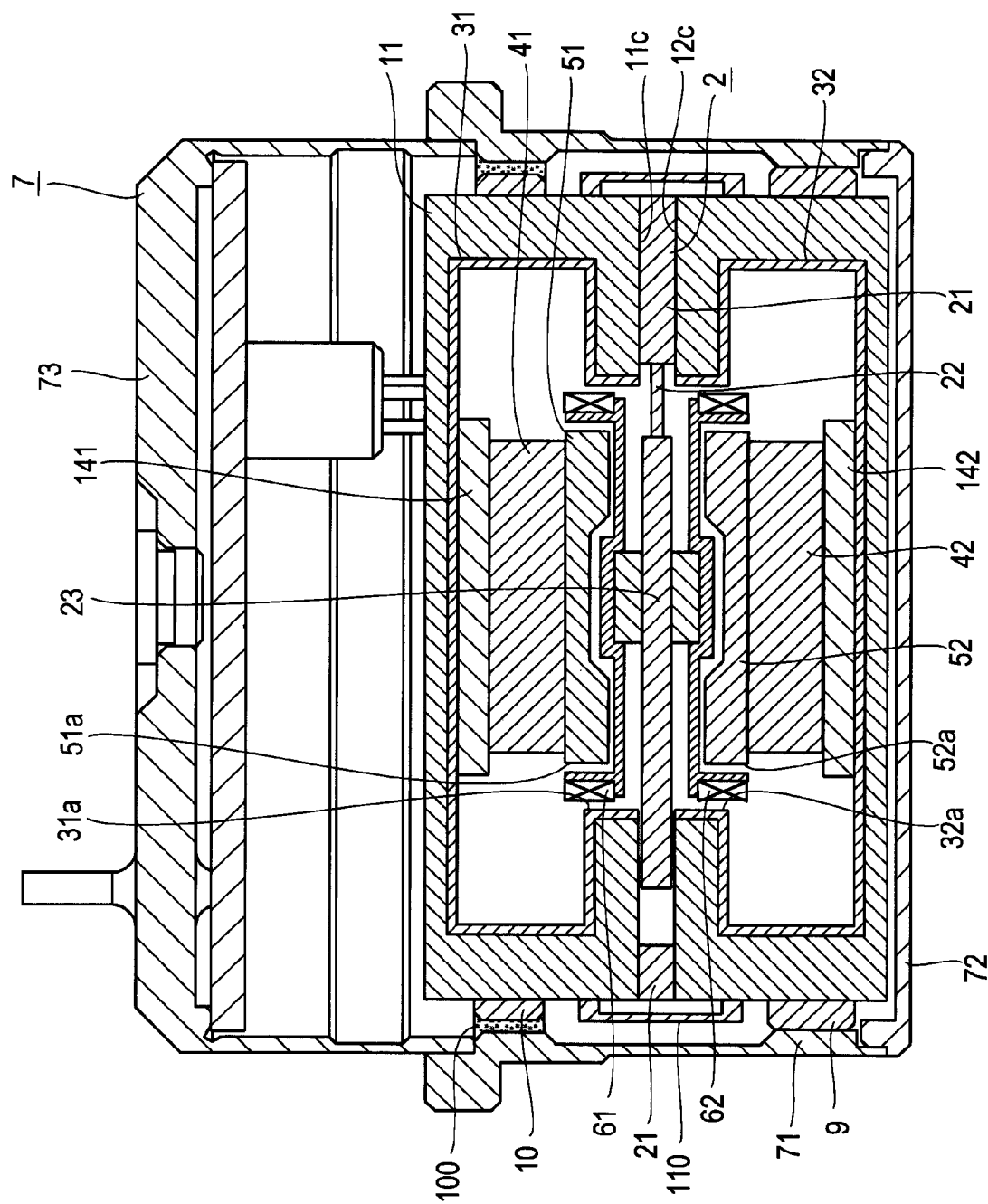
FIG. 3 is a cross-sectional view illustrating a configuration of yet another embodiment of a servo accelerometer according to the present invention.

As illustrated in FIG. 3, the magnetic reinforcing elements 31, 32 may be formed by iron plating applied on the inner surfaces of the magnetic yokes 11, 12. A method for mending a mold, for example, by thickly plating a portion of the mold to be mended with iron has been established. The inner surfaces of the magnetic yokes 11, 12 may be plated with iron by the method. After the inner surfaces of the magnetic yokes 11, 12 have been plated with iron, pole piece bottoms 141, 142, magnets 41, 42 and pole piece tops 51, 52 may be stacked in sequence on the inner bottom of the magnetic yokes 11, 12. The pole piece bottoms 141, 142 may be made of a material such as electromagnetic soft iron.

By setting appropriate conditions, the components can be joined by other joining method such as bonding. Since the material of the magnetic circuits such as electromagnetic soft iron is prone to corrosion in normal conditions, the surface of the material is preferably coated with an appropriate anticorrosive material such as nickel or chrome.

The variations of the bonding method and anticorrosion treatment described above can be applied to any of the embodiments described above. Any combination of all or some of the variations described above may be applied to any of the embodiments described above. It will be understood that other modifications can be made to the embodiments as appropriate without departing from the spirit of the present invention.

[Experimental Results]

Figure 4:
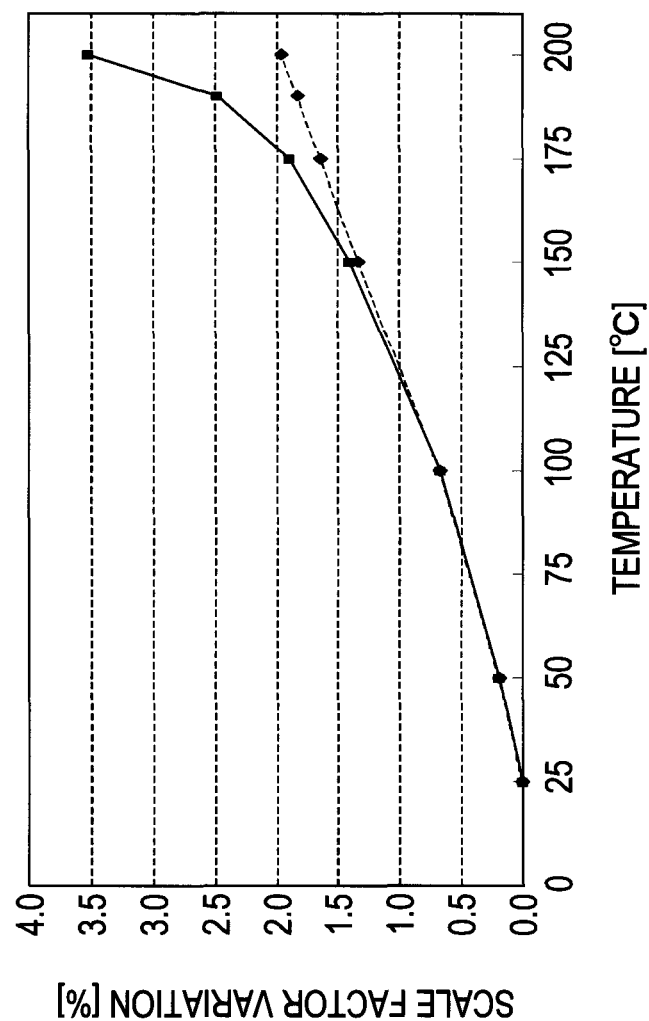
FIG. 4 is a graph illustrating degradation of a temperature characteristic of the scale factor of a conventional servo accelerometer in a high-temperature range.
Figure 9:
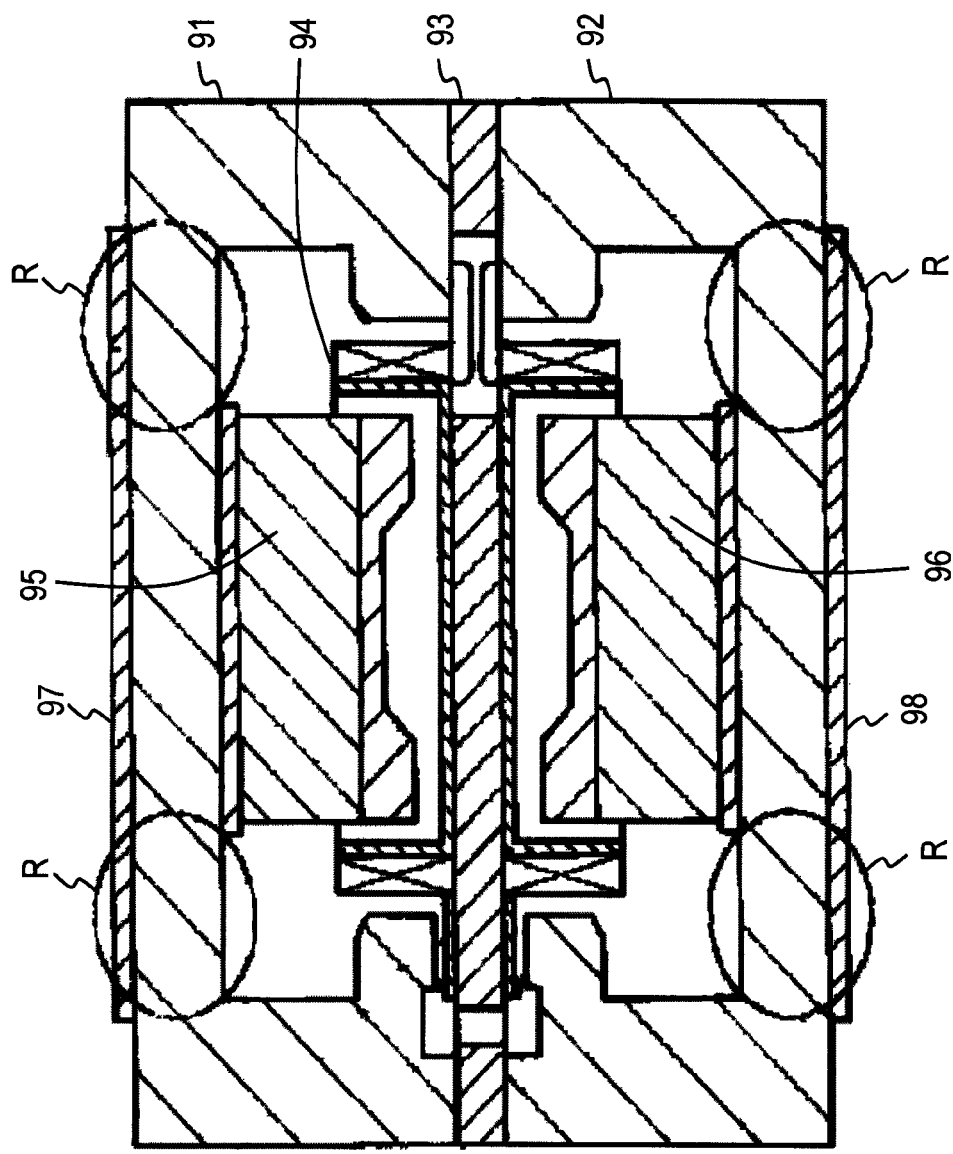
FIG. 9 is a cross-sectional view illustrating a configuration of a conventional servo accelerometer.

If the magnetic reinforcing plates 97, 98 having a higher saturation flux density than the magnetic yokes 91, 92 are attached to the outer bottoms of the cup-shaped magnetic yokes 91, 92 as in Patent literature 1, flux saturation is likely to occur in regions R in FIG. 9. At temperatures (around and over 180° C. in this example) close to the Curie temperature of the invar (approximately 210° C.), the scale factor variation drastically increases as represented by the solid curve in FIG. 4. The dashed curve in FIG. 4 represents a temperature characteristic of the scale factor dependent on variations in temperature on the assumption that flux saturation does not occur under the same conditions.

The scale factor can be calculated from input acceleration [G] and output current [mA] of the servo accelerometer at the time of the input: scale factor=output current/acceleration. The scale factor variation is percentage of variation in scale factor with respect to the scale factor at 25° C. and can be calculated as: scale factor variation=(scale factor at temperature of interest−scale factor at 25° C.)/scale factor at 25° C.

Figure 5:
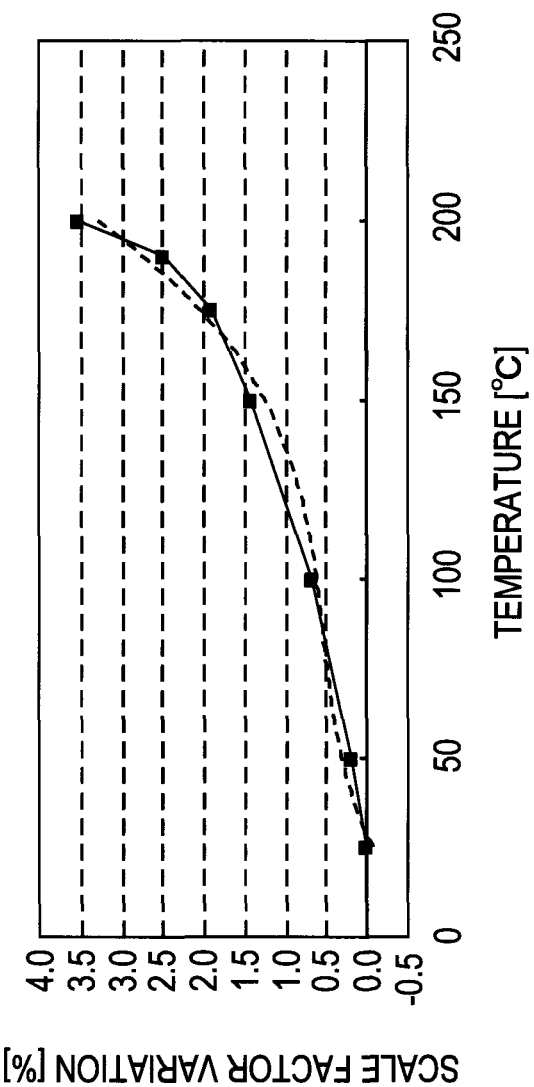
FIG. 5 is a graph illustrating a temperature characteristic of the scale factor of the conventional servo accelerometer and a cubic curve approximating the temperature characteristic of the scale factor.
Figure 6:
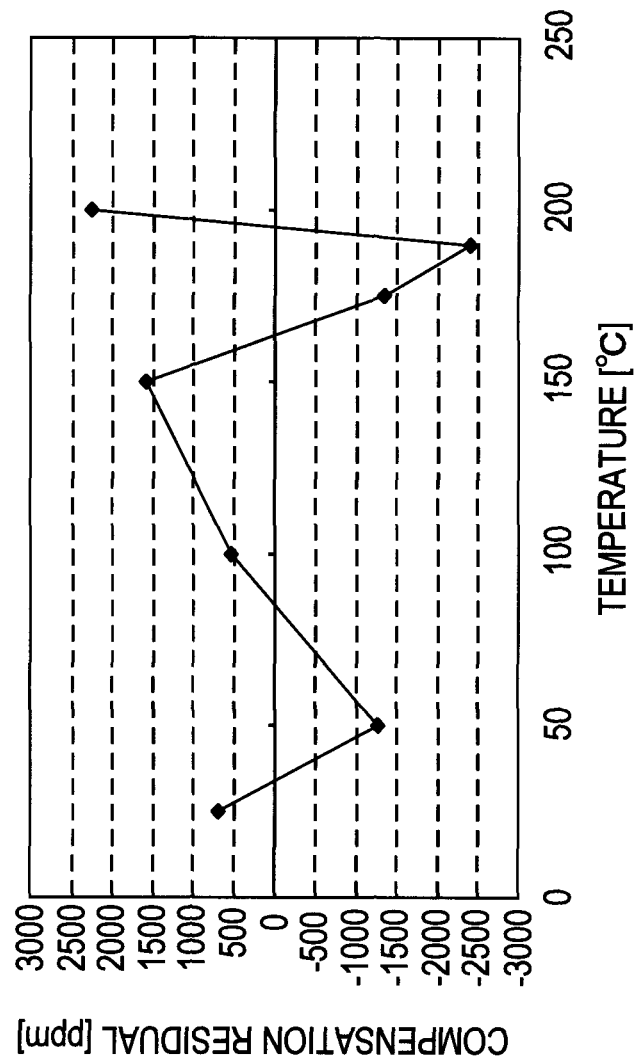
FIG. 6 is a graph illustrating compensation residual of the conventional servo accelerometer.

The solid curve in FIG. 5 represents a temperature characteristic of the scale factor of the servo accelerometer described in Patent literature 1 and the dashed curve in FIG. 5 represents an spline curve approximating the temperature characteristic of the scale factor by a cubic polynomial. FIG. 6 illustrates compensation residual in the case of correcting by the cubic curve represented by the dashed curve in FIG. 5.

Figure 7:
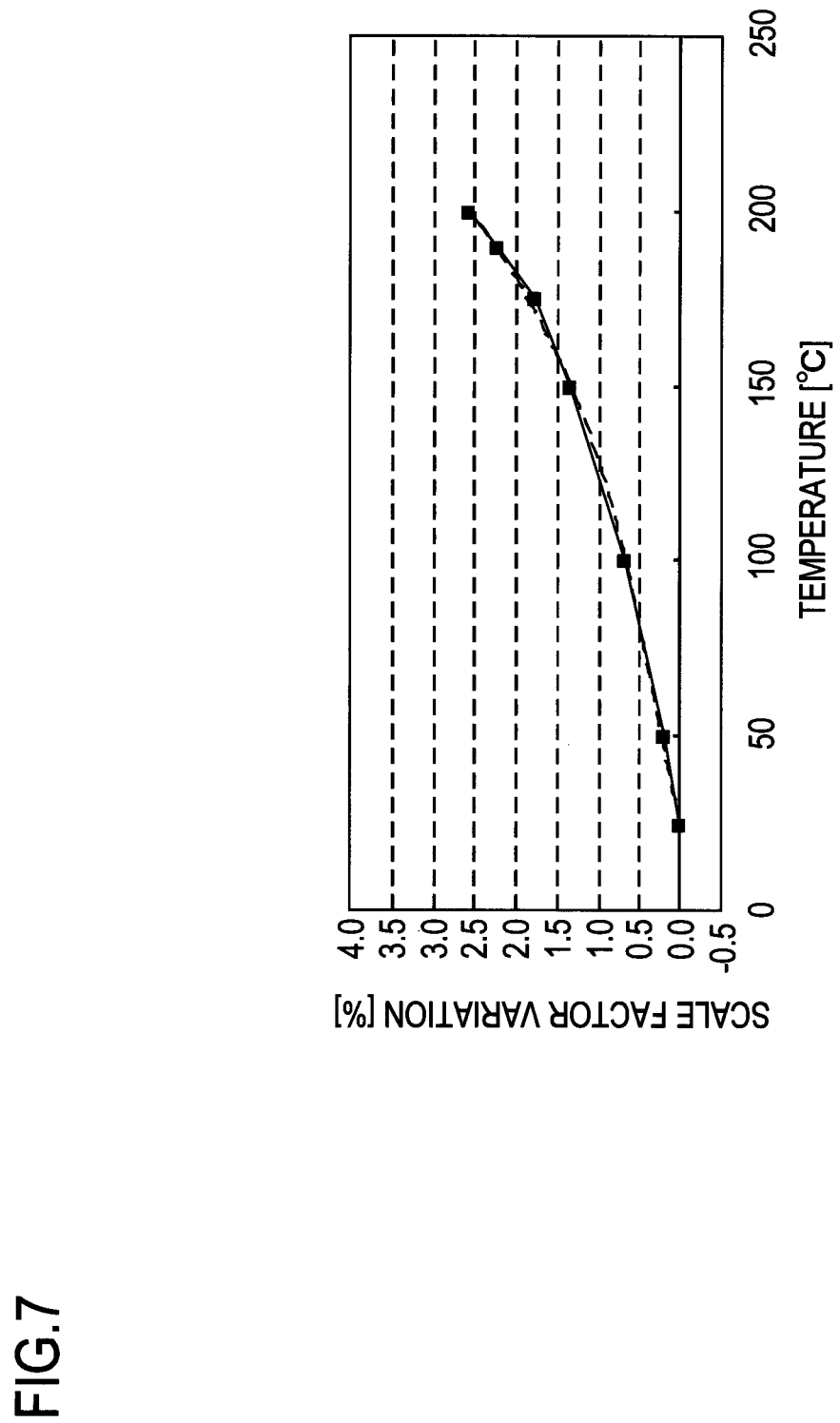
FIG. 7 is a graph illustrating a temperature characteristic of the scale factor of an embodiment of the present invention and a cubic curve approximating the temperature characteristic of the scale factor.
Figure 8:
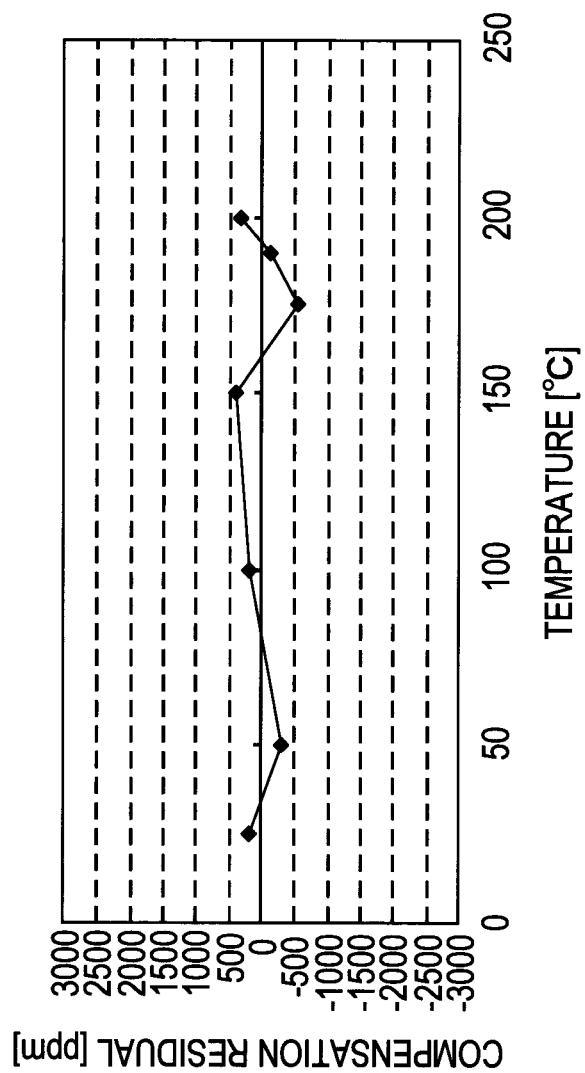
FIG. 8 is a graph illustrating compensation residual of an embodiment of the present invention.

The solid curve in FIG. 7 represents a temperature characteristic of the scale factor of the servo accelerometer of an embodiment of the present invention and the dashed curve in FIG. 7 represents a spline curve approximating the temperature characteristic of the scale factor by a cubic polynomial. FIG. 8 illustrates compensation residual in the case of correcting by the cubic curve represented by the dashed curve in FIG. 7.

In the case of the servo accelerometer described in Patent literature 1, a curve that properly corrects a drastic change in scale factor in a high-temperature range cannot be established and there is large compensation residual. In the case of the servo accelerometer of the embodiment of the present invention, in contrast, a drastic change in temperature characteristic are eliminated, which fact shows that corrections are properly made.

What is claimed is:

1. A servo accelerometer in which a position to which a pendulum swings from a neutral position is detected, the pendulum is returned to the neutral position by an electromagnetic action based on the swing of the pendulum, and acceleration is detected based on an amount of current required for the electromagnetic action, the servo accelerometer comprising:
two cup-shaped magnetic yokes, each having an open side and a closed side closed by a closing plate;
a pendulum part comprising a swingable pendulum, the pendulum part sandwiched between the open sides of the two magnetic yokes;
canister-shaped magnetic reinforcing elements, each being disposed inside each of the magnetic yokes, the magnetic reinforcing elements being made of a ferromagnetic material having a Curie temperature higher than the magnetic yokes;
magnets, each being disposed on a bottom of each of the magnetic reinforcing elements;
pole piece tops, each being disposed on each of the magnets; and
torquer coils attached to the pendulum;
wherein an inner periphery of an opening in each of the magnetic reinforcing elements faces an outer periphery of each of the pole piece tops and each of the torquer coils is located between the inner periphery of the opening in each of the magnetic reinforcing elements and the outer periphery of each of the pole piece tops.

2. The servo accelerometer according to claim 1, wherein:
the magnetic yokes are made of a material having a thermal expansion rate lower than the magnetic reinforcing elements; and
a central region of an outer bottom of each of the magnetic reinforcing elements is welded to each of the magnetic yokes.

3. The servo accelerometer according to claim 1 or 2, wherein each of the magnetic yokes is formed by integrating a pickoff ring with a main body, the pickoff ring having a shape of a toroidal disc including the open side, the main body including the closed side.

4. The servo accelerometer according to claim 1, wherein the magnetic reinforcing elements are iron plating applied on inner surfaces of the magnetic yokes.

* * * * *

UNITED STATES PATENT AND TRADEMARK OFFICE
CERTIFICATE OF CORRECTION

PATENT NO. : 8,459,113 B2  
APPLICATION NO. : 13/013614  
DATED : June 11, 2013  
INVENTOR(S) : Kenji Kuramoto et al.

Page 1 of 1

It is certified that error appears in the above-identified patent and that said Letters Patent is hereby corrected as shown below:

On the Title page, 2nd inventor Yoshiyuki Ando, city of residence should be "Tokyo."

Signed and Sealed this  
Eighth Day of October, 2013

Teresa Stanek Rea  
*Deputy Director of the United States Patent and Trademark Office*